United States Patent
Khalili et al.

(10) Patent No.: US 9,176,233 B2
(45) Date of Patent: Nov. 3, 2015

(54) METHOD AND APPARATUS FOR RECEIVING NAVIGATION SATELLITE SIGNALS FROM TWO BANDS

(71) Applicant: QUALCOMM Incorporated, San Diego, CA (US)

(72) Inventors: Alireza Khalili, Sunnyvale, CA (US); Hong Sun Kim, San Jose, CA (US); Jin-Su Ko, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 385 days.

(21) Appl. No.: 13/797,033

(22) Filed: Mar. 12, 2013

(65) Prior Publication Data

US 2015/0198718 A1  Jul. 16, 2015

(51) Int. Cl.
| | |
|---|---|
| *H04B 7/185* | (2006.01) |
| *H04J 3/00* | (2006.01) |
| *H04J 3/04* | (2006.01) |
| *G01S 19/35* | (2010.01) |
| *G01S 19/32* | (2010.01) |
| *G01S 19/21* | (2010.01) |
| *G01S 19/33* | (2010.01) |
| *H04W 52/02* | (2009.01) |

(52) U.S. Cl.
CPC ............... *G01S 19/32* (2013.01); *G01S 19/21* (2013.01); *G01S 19/33* (2013.01); *H04W 52/0216* (2013.01)

(58) Field of Classification Search
CPC ....... G01S 5/01; G01S 5/0226; G01S 5/0289; G01S 19/11; G01S 19/23; G01S 19/32–19/33; G01S 19/36–19/37; G01S 19/246; G01S 19/21; G01S 19/41; G01S 19/45; G01S 19/421; G01S 19/425; H04W 16/14; H04W 24/02; H04W 64/00; H04W 72/1215; H04W 52/0216; H04B 1/0071; H04B 1/709; H04B 7/0404; H04B 7/0413; H04B 17/21; H04B 17/27; H04B 17/318; H04J 3/1694
USPC .................................. 370/310–350, 532–545
See application file for complete search history.

(56) References Cited

U.S. PATENT DOCUMENTS

| | | | |
|---|---|---|---|
| 5,678,169 A | 10/1997 | Turney | |
| 7,171,175 B2* | 1/2007 | Lahti et al. | ..................... 455/135 |
| 7,460,615 B2* | 12/2008 | Kunysz et al. | ................ 375/316 |

(Continued)

FOREIGN PATENT DOCUMENTS

EP        1198078 B1     11/2006

OTHER PUBLICATIONS

International Search Report and Written Opinion—PCT/US2014/017801—ISA/EPO—Jul. 9, 2014.

*Primary Examiner* — Tri H Phan
(74) *Attorney, Agent, or Firm* — Silicon Valley Patent Group LLP (57) ABSTRACT

Systems, apparatus and methods in a mobile device to multiplex two global navigation satellite system (GNSS) signals on a single hardware receiver chain are presented. The GNSS signals may come from a common GNSS system on two bands of two different GNSS systems overlapping on a common band. A duty cycle of the GNSS signals may be based on a harmonic being within one of the first band and the second band. The duty cycle may be based on signal quality, such as indicating a jammed or non jammed signal. The duty cycle may be of unequal proportions and less than 100% such that the receiver chain is idle for a percentage of time.

24 Claims, 9 Drawing Sheets

(56) References Cited

U.S. PATENT DOCUMENTS

| | | | |
|---|---|---|---|
| 7,859,453 B2* | 12/2010 | Rowitch et al. | 342/357.21 |
| 8,044,853 B2 | 10/2011 | Zhao et al. | |
| 8,059,698 B2* | 11/2011 | Mester et al. | 375/150 |
| 8,111,189 B2* | 2/2012 | Abraham | G01S 19/235 |
| | | | 342/357.62 |
| 8,193,980 B2* | 6/2012 | Nayyar | G01S 19/29 |
| | | | 342/357.48 |
| 8,412,093 B2* | 4/2013 | Liu et al. | 455/3.02 |
| 8,681,043 B2* | 3/2014 | Abraham | G01S 19/235 |
| | | | 342/357.62 |
| 8,933,839 B2* | 1/2015 | Lin | 342/357.72 |
| 9,001,868 B2* | 4/2015 | Orejas | H03J 1/0008 |
| | | | 375/149 |
| 2006/0227905 A1 | 10/2006 | Kunysz et al. | |
| 2008/0057884 A1* | 3/2008 | Wei et al. | 455/130 |
| 2009/0081978 A1 | 3/2009 | Chen et al. | |
| 2009/0109091 A1* | 4/2009 | Thind et al. | 342/357.12 |
| 2009/0322596 A1 | 12/2009 | Rowitch et al. | |
| 2010/0099351 A1 | 4/2010 | Liu et al. | |
| 2011/0057837 A1 | 3/2011 | Lin | |
| 2011/0095943 A1 | 4/2011 | Letestu et al. | |
| 2013/0207839 A1* | 8/2013 | Simic | G01S 19/21 |
| | | | 342/357.59 |
| 2014/0292569 A1* | 10/2014 | Wallace | G01S 19/43 |
| | | | 342/357.42 |

\* cited by examiner

| Signal | Center frequency (MHz) |
|---|---|
| COMPASS B1 | 1561.098 |
| COMPASS B1-2 | 1589.742 |
| COMPASS B2 | 1207.14 |
| COMPASS B3 | 1268.52 |
| Galileo E1 | 1575.42 |
| Galileo E5A | 1176.45 |
| Galileo E5B | 1207.14 |
| Galileo E6 | 1278.75 |
| GLONASS L1 | 1602.00 |
| GLONASS L2 | 1246.00 |
| GPS L1 | 1575.42 |
| GPS L2 | 1227.60 |
| GPS L5 | 1176.45 |

Good L1 / jammed L2

FIG. 14

Good L1 / good L2

FIG. 15

Both strong or saving battery power

METHOD AND APPARATUS FOR RECEIVING NAVIGATION SATELLITE SIGNALS FROM TWO BANDS

BACKGROUND

I. Field of the Invention

This disclosure relates generally to systems, apparatus and methods for receiving both L1 and L2 Global Navigation Satellite System (GNSS) signals and more particularly L1 and L2 Global Positioning Satellite (GPS) signals and L1 and L2 GLONASS signals in a time-multiplexed fashion using a single hardware receiver chain.

II. Background

Typically, GPS and other GNSS receivers operate with two hardware receiver chains: a first chain for the L1 band signal and a second for the L2 band signal. Each receiver chain requires and consumes power. To save hardware cost and battery power, what is needed is a receiver that requires less power than a two-chain receiver.

BRIEF SUMMARY

Disclosed are systems, apparatus and methods in a mobile device to multiplex two global navigation satellite system (GNSS) signals on a single hardware receiver chain. The GNSS signals, such as GPS signals, may be found on an L1 band and an L2 band. The GNSS signals may come from a common GNSS system on two bands of two different GNSS systems overlapping on a common band. For example, the different GNSS systems may overlap and share a common center frequency. The GNSS signals may be multiplexes based on transmissions from a wireless local area network (WLAN) and/or a wireless wide area network (WWAN). A duty cycle of the GNSS signals may be based on a harmonic being within one of the first band and the second band. The duty cycle may be based on signal quality, such as indicating a jammed or non jammed signal. The duty cycle may be of unequal proportions and less than 100% such that the receiver chain is idle for a percentage of time.

According to some aspects, disclosed is a method in a mobile device to multiplex two global navigation satellite system (GNSS) signals on a single hardware receiver chain, the method comprising: generating a control signal indicating a first GNSS signal on a first band during a first period and a second GNSS signal on a second band during a second period; generating a first oscillator signal from a local oscillator (LO) during the first period and a second oscillator signal from the LO during the second period based on the control signal; mixing, during the first period, the first GNSS signal from an antenna with the first oscillator signal to result in a first down converted signal; mixing, during the second period, the second GNSS signal from the antenna with the second oscillator signal to result in a second down converted signal; de-multiplexing the first down converted signal during the first period and the second down converted signal during the second period based on the control signal; demodulating, during the first period, the first down converted signal; and demodulating, during the second period, the second down converted signal; wherein the first oscillator signal and the second oscillator signal comprise different frequencies.

According to some aspects, disclosed is a mobile device to multiplex two global navigation satellite system (GNSS) signals on a single hardware receiver chain, the mobile device comprising: a controller configured to provide a control signal indicating a first GNSS signal on a first band during a first period and a second GNSS signal on a second band during a second period; a local oscillator (LO) coupled to the controller, and configured to receive the control signal and to provide a first oscillator signal during the first period and a second oscillator signal during the second period, wherein the first oscillator signal and the second oscillator signal comprise different frequencies; a mixer with inputs coupled to the LO and to an antenna, the mixer configured to generate a first down converted signal during the first period and generate a second down converted signal during the second period; and a de-multiplexer coupled to the mixer and configured to separate the first down converted signal during the first period from the second down converted signal during the second period based on the control signal; and a demodulator coupled to the de-multiplexer and configured to demodulate the first down converted signal during the first period and demodulate the second down converted signal during the second period.

According to some aspects, disclosed is a mobile device to multiplex two global navigation satellite system (GNSS) signals on a single hardware receiver chain, the mobile device comprising: means for generating a control signal indicating a first GNSS signal on a first band during a first period and a second GNSS signal on a second band during a second period; means for generating a first oscillator signal from a local oscillator (LO) during the first period and a second oscillator signal from the LO during the second period based on the control signal; means for mixing, during the first period, the first GNSS signal from an antenna with the first oscillator signal to result in a first down converted signal; means for mixing, during the second period, the second GNSS signal from the antenna with the second oscillator signal to result in a second down converted signal; means for de-multiplexing the first down converted signal during the first period and the second down converted signal during the second period based on the control signal; means for demodulating, during the first period, the first down converted signal; and means for demodulating, during the second period, the second down converted signal; wherein the first oscillator signal and the second oscillator signal comprise different frequencies.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIGS. 12-16 show various duty cycle signals and logic to create duty cycle signals for a shared L1/L2 hardware receiver chain 202, in accordance with some embodiments of the present invention.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), Time Division Synchronous Code Division Multiple Access (TD-SCDMA). and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs).

For example, a SV in a constellation of Global Navigation Satellite System (GNSS) such as Global Positioning System (GPS) (USA), Galileo (Europe), GLONASS (Russia), or BeiDou/COMPASS (China) may transmit a signal marked with a PN code that is distinguishable from PN codes transmitted by other SVs in the constellation (e.g., using different PN codes for each satellite as in GPS or using the same code on different frequencies as in GLONASS). For clarification, phase I BeiDou (BeiDou-1 or BeiDou Satellite Navigation Experimental System), phase II BeiDou (BeiDou-2 or BeiDou Navigation Satellite System (BDS)), and phase III BeiDou (BeiDou II/COMPASS) may be referred to collectively as BeiDou/COMPASS, or simply COMPASS. BeiDou/COMPASS has a coverage area across Asia and India.

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, BeiDou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop, tablet or other suitable mobile device which is capable of receiving wireless communication and/or navigation signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all devices, including wireless communication devices, computers, laptops, tablets, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

Figure 1:
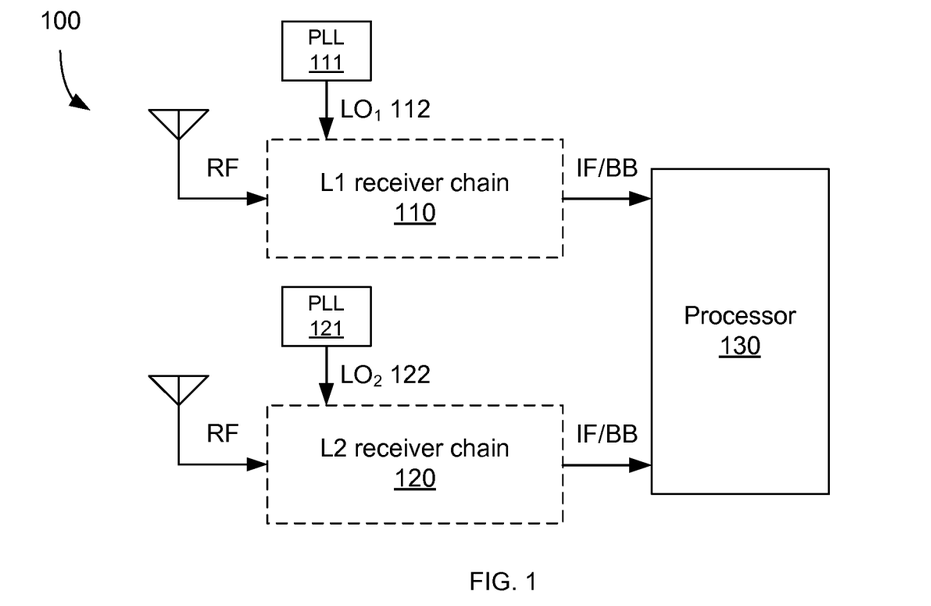
FIG. 1 shows a GNSS receiver with two separate hardware receiver chains.

FIG. 1 shows a GNSS receiver 100 with two separate hardware receiver chains. A known receiver includes two receiver chains: an L1 band receiver chain 110 and an L2 band receiver chain 120. Each receiver chain accepts a radio frequency (RF) signal as an analog input signal from an antenna and a local oscillator (LO1 112 and LO2 122, respectively) and provides a digital output to a processor 130. LO1 112 and LO2 122 are provided by two phase-locked loops (PLL 111 and PLL 121). The processor 130 accepts an interim frequency (IF) signal and further processes the IF signal by down converting to a baseband (BB) signal, and then filtering and demodulating the BB signal. Alternatively, the processor 130 accepts a baseband (BB) signal, and then filters and demodulates the BB signal from each receiver chain.

FIGS. 2-5 show details of a GNSS receiver 200, in accordance with some embodiments of the present invention. The GNSS receiver 200 consists of a shared L1/L2 hardware receiver chain 202 and a processor 300. Other aspects of signals received from multiple GNSS signal sources and being processed in a single receiver chain are shown in issued U.S. Pat. No. 8,044,853 titled "Navigation receiver" and issued Oct. 25, 2011, incorporated herein by reference.

Figure 2:
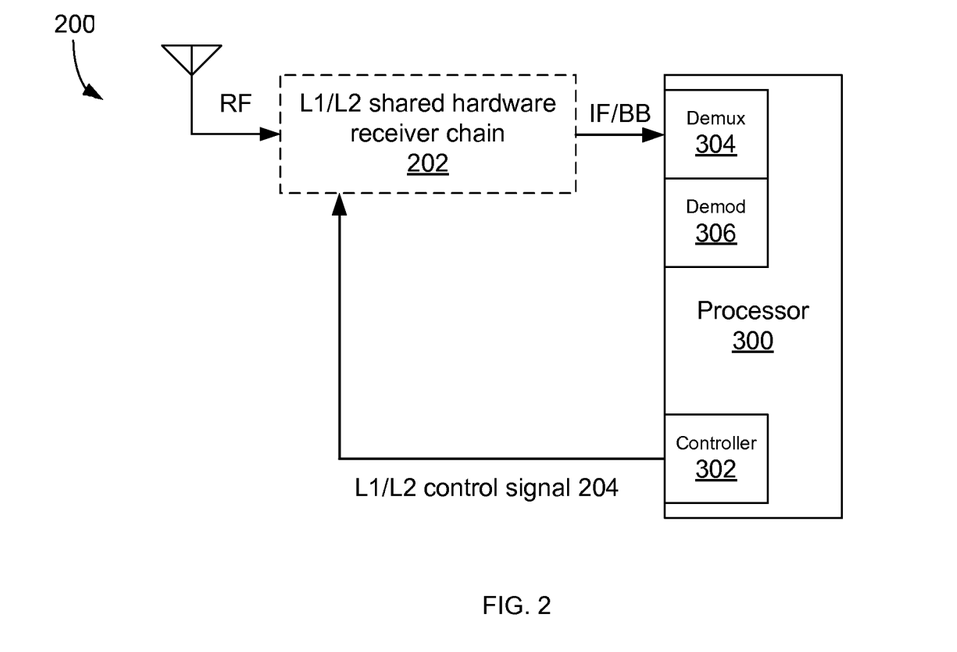
FIGS. 2-5 show details a GNSS receiver with a single shared hardware receiver chain, in accordance with some embodiments of the present invention.

In FIG. 2, a single shared L1/L2 hardware receiver chain 200 replaces the two separate receiver chains (i.e., L1 receiver chain 110 and L2 receiver chain 120) of FIG. 1. The shared L1/L2 hardware receiver chain 202 accepts an RF signal as an input signal from an antenna and an L1/L2 hardware control signal 204 from a controller 302 in a processor 300. The shared L1/L2 hardware receiver chain 202 produces either a digital IF signal or digital BB signal for a de-multiplexer module (demux 304) and s demodulator module (demod 306) of the processor 300. The L1/L2 control signal 204 instructs the shared L1/L2 hardware receiver chain 202 to receive and down convert either an L1 signal or an L2 signal in a multiplexed fashion.

Figure 3:
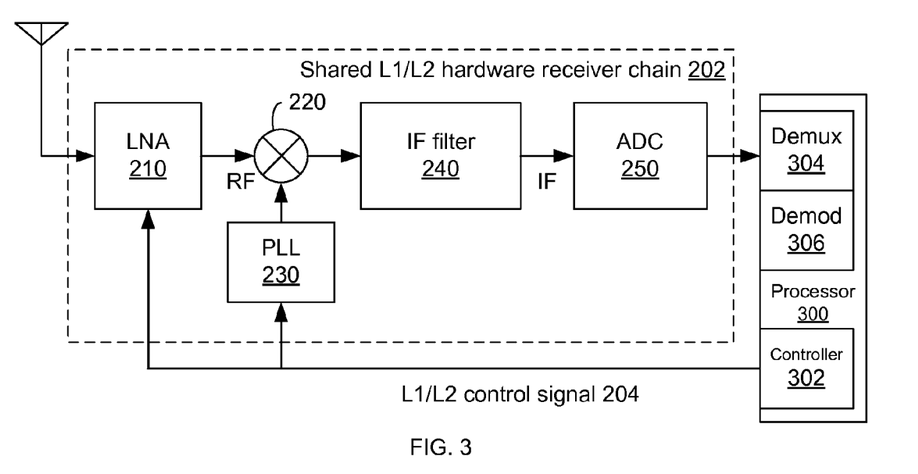
Figure 4:
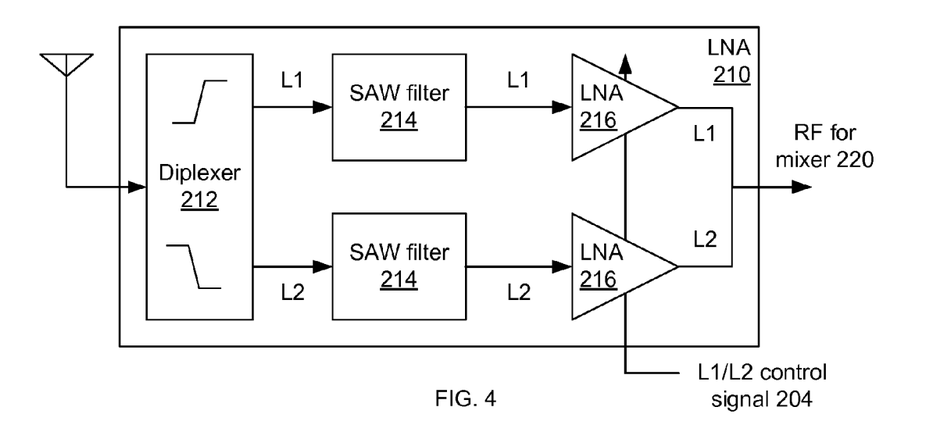
Figure 5:
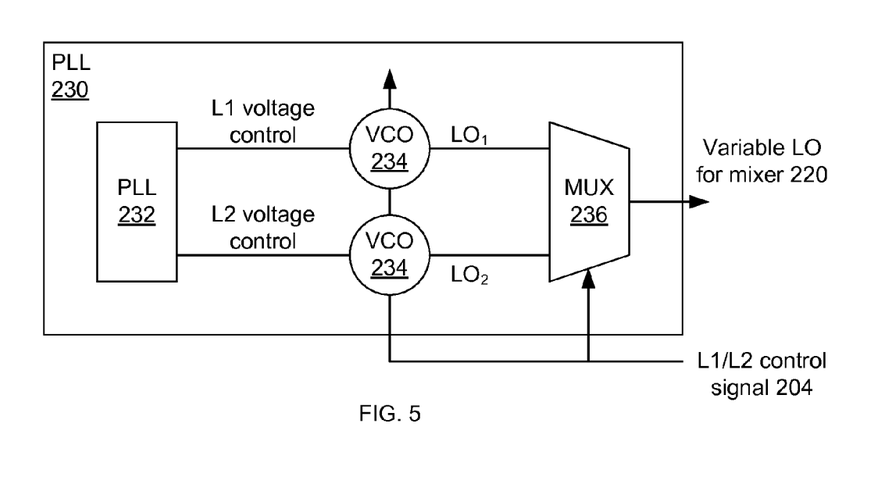

FIGS. 3-5 show details of the shared L1/L2 hardware receiver chain 202, in accordance with some embodiments of the present invention. In FIG. 3, the shared L1/L2 hardware receiver chain 202 is coupled to an L1/L2 antenna to receive an analog input signal and to produce a digital output signal for a processor 300. The shared L1/L2 hardware receiver chain 202 is a standard analog receiver chain but with a variable local oscillator (LO) from the PLL 230. The shared L1/L2 hardware receiver chain 202 includes a low-noise amplifier (LNA 210) coupled to a mixer 220. The LNA 210 is supplied the L1/L2 control signal 204, from the controller 302, to select the proper LNA band. The mixer 220 receives an input from a phase-locked loop (PLL 230). The PLL 230 also receives the L1/L2 control signal 204, from the controller 302, instructing it whether to provide an L1 LO or an L2 LO. Based on the LO, the mixer 220 places the band signal within the appropriate spectrum of the IF spectrum. The mixer 220 under the control of the PLL 230 acts as a multiplexer multiplexing the first then the second GNSS signal in the shared L1/L2 hardware receiver chain 202. The mixer 220 provides a down converted signal to an IF filter 240, which provides a signal that is digitized by an analog-to-digital (A/D) converter (ADC 250). The processor 300 includes an IF-to-BB down converter module and a baseband filter module as software instructions within the processor 300. The processor also includes a demodulator module 306. In this manner, an output signal from the A/D converter 250 is converted from the intermediate band to the baseband by the processor 300. The baseband filter may dynamically adjust such that when the receiver chain is active with the L1 band signal, the baseband filter passes just the L1 band signal. When the receiver chain is later active with the L2 band signal, the baseband filter passes just the L2 band signal.

In FIG. 4, details of one example LNA 210 are shown. LNA 210 consists of a diplexer 212, an L1 SAW (surface acoustic wave) filter 214, an L2 SAW filter 214, an L1 LNA amplifier 216, and an L2 LNA amplifier 216. Diplexer 212 accepts an antenna input signal and splits the received L1 band signal from the received L2 band signal. Diplexer 212 provides one output signal as an input signal to the L1 SAW filter 214 and a second output signal as an input signal to the L2 SAW filter 214. The SAW filters 214 are common electromechanical devices used to convert electrical signals to mechanical waves, delay these mechanical waves and then converting the waves back to electrical signals using electrodes. These electrical signals are fed to LNA amplifiers 216 to provide gain to the respective L1 and L2 band signals. LNA amplifiers 216 are enabled or disabled based on the L1/L2 control signal 204 from the controller 302. Outputs of LNA amplifiers 216 are connected together to provide a resultant RF for mixer 220 of FIG. 3.

In FIG. 5, details of one example PLL 230 are shown. PLL 230 includes a PLL circuit 232, an L1 VCO (voltage controlled oscillator) 234, an L2 VCO 234 and a multiplexer (mux 236). The PLL circuit 232 provides two stable voltages to be used as inputs to VCOs 234. That is, an L1 voltage control feeds L1 VCO 234 and an L2 voltage control feeds L2 VCO 234. The VCOs 234 are enabled or disabled with the L1/L2 control signal 204 from the controller 302. Output signals from the VCOs 234 are selected by mux 236 using the L1/L2 control signal 204 as a control signal.

Figure 6:
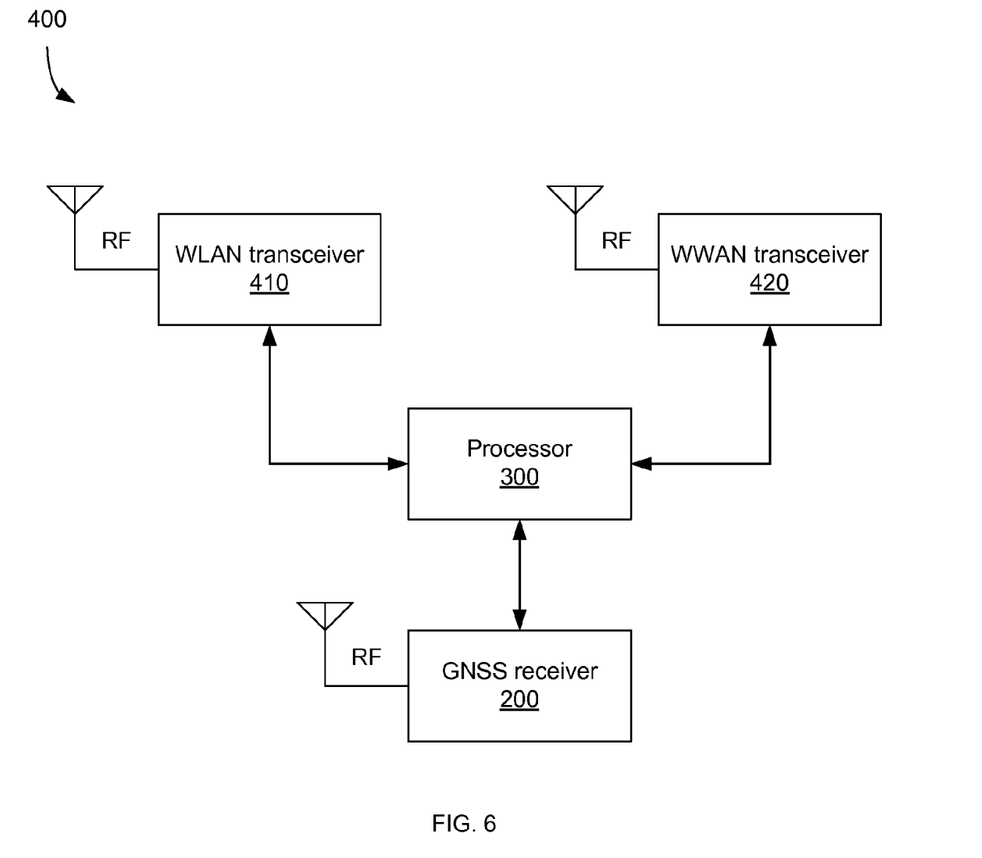
FIG. 6 shows transmitters and receivers of a mobile device 400, in accordance with some embodiments of the present invention.

FIG. 6 shows transmitters and receivers of a mobile device 400, in accordance with some embodiments of the present invention. Mobile device 400 includes a processor 300 coupled to a GNSS receiver 200, a WLAN transceiver 410 and a WWAN transceiver 420. IF and/or BB modulation, demodulation and digital signal processing of the GNSS receiver 200, WLAN transceiver 410 and WWAN transceiver 420 may occur in the processor 300. Unfortunately, the WLAN transceiver 410 and WWAN transceiver 420 may interfere with signals received from the GNSS receiver. For example, the WWAN transceiver 410 and WWAN transceiver 420 may transmit signals that cause harmonic interference in either the L1 or L2 bands.

Figure 7A:
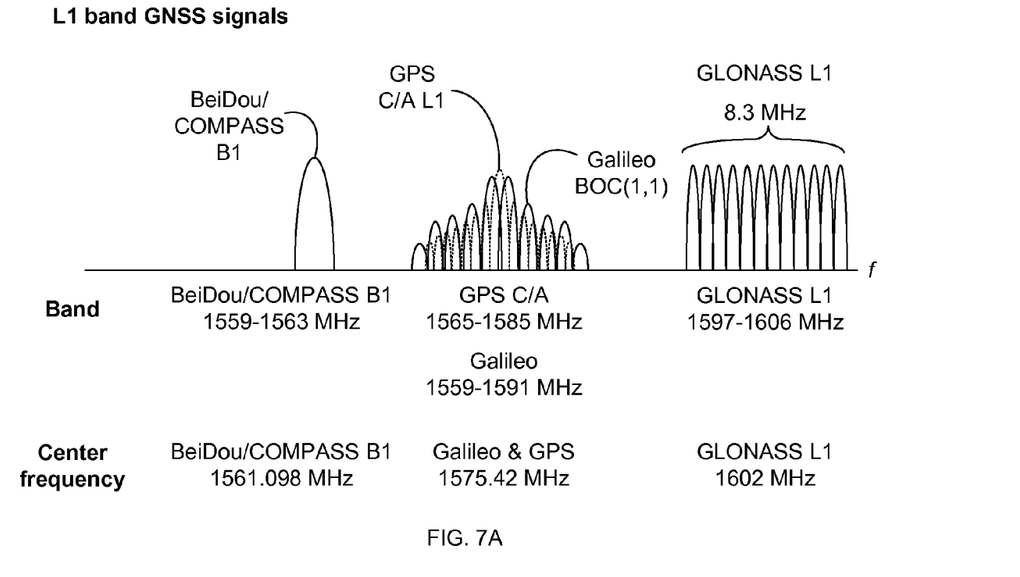
FIGS. 7A, 7B and 8 show a frequency spectrum with GNSS signals.
Figure 7B:
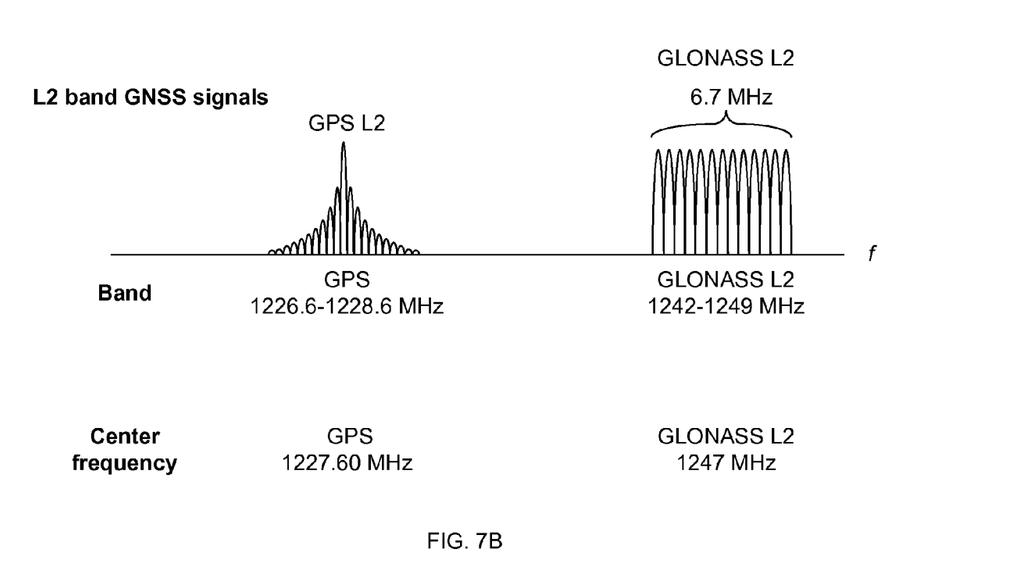
Figure 8:
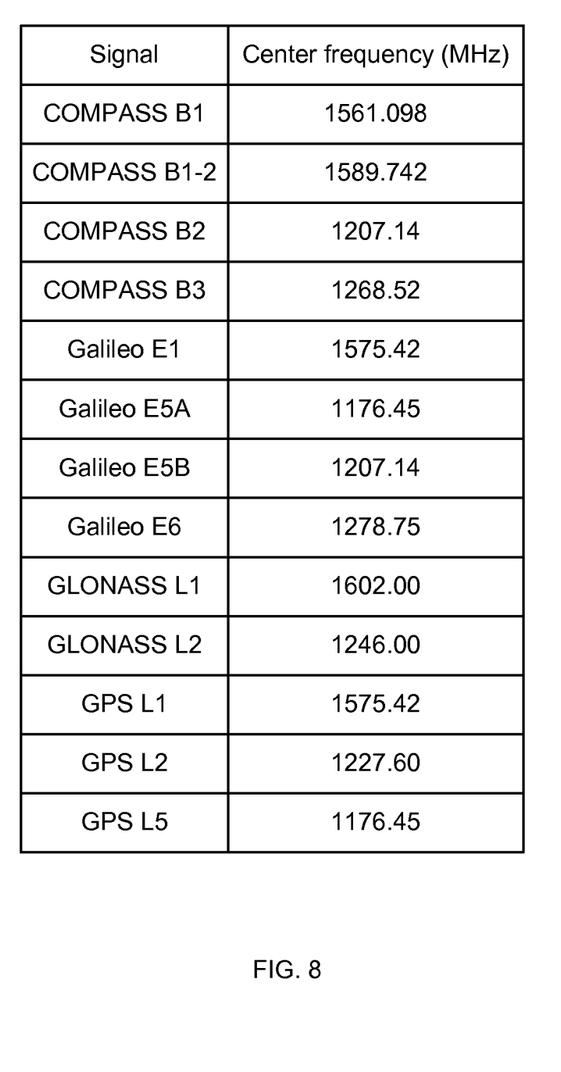

FIGS. 7A, 7B and 8 show a frequency spectrum with GNSS signals. In FIG. 7A, L1 band GNSS signals are shown. A BeiDou/COMPASS B1 signal occupies 1559-1563 MHz with a carrier frequency of 1561.098 MHz. A GPS L1 coarse-acquisition (C/A) signal (dotted lines) overlaps with a Galileo BOC(1,1) signal (solid lines) at 1565-1585 MHz with a center frequency of 1575.42 MHz (sometimes referred to as the 1.6 GHz L1 band). A 8.3 MHz wide GLONASS signal is at 1597-1606 MHz (sometimes referred to as the GLONASS L1 band). In FIG. 7B, L2 band GNSS signals are shown. A GPS L2 signal is shown at 1226.6-1228.6 MHz with a center frequency of 1227.60 MHz. Also, a GLONASS L2 signal 6.7 MHz wide is shown at 1242-1249 MHz with a center frequency of 1247 MHz.

In FIG. 8, signals and center frequencies (in MHz) are shown in alphabetical order for the E5/L5 band, L2 band, E6 band and E1/L1 band. A BeiDou/COMPASS B1 signal is centered at 1561.098 MHz with a bandwidth of 4.092 MHz. A BeiDou/COMPASS B1-2 signal is centered at 1589.742 MHz with a bandwidth of 4.092 MHz. A BeiDou/COMPASS B2 signal is centered at 1207.14 MHz with a bandwidth of 24 MHz. A BeiDou/COMPASS B3 signal is centered at 1268.52 MHz with a bandwidth of 24 MHz. A Galileo E1 signal is centered at 1575.42 MHz with a bandwidth of 12 MHz. A Galileo E5A signal is centered at 1176.45 MHz with a bandwidth of 12.5 MHz. A Galileo E5B signal is centered at 1207.14 MHz with a bandwidth of 12.5 MHz. A Galileo E6 signal is centered at 1278.75 MHz with a bandwidth of 20 MHz. A GLONASS L1 signal is centered at 1602.00 MHz with a bandwidth of 6.5 MHz. A GLONASS L2 signal is centered at 1247.00 MHz with a bandwidth of 5.0 MHz. A GPS L1 signal is centered at 1575.42 MHz with a bandwidth of 15.345 MHz. A GPS L2 signal is centered at 1227.60 MHz with a bandwidth of 11 MHz. A GPS L3 signal is centered at 1176.45 MHz with a bandwidth of 12.5 MHz. Not listed is the IRNSS system with a center frequency of 1176.42 MHz in the E5/L5 band. Also not listed is the QZSS system with center frequencies of 1176.45 MHz in the E5/L5 band, 1227.6 MHz in the L2 band, 127.75 MHz in the E6 band, and 1575.42 MHz in the E1/L1 band.

Figure 9:
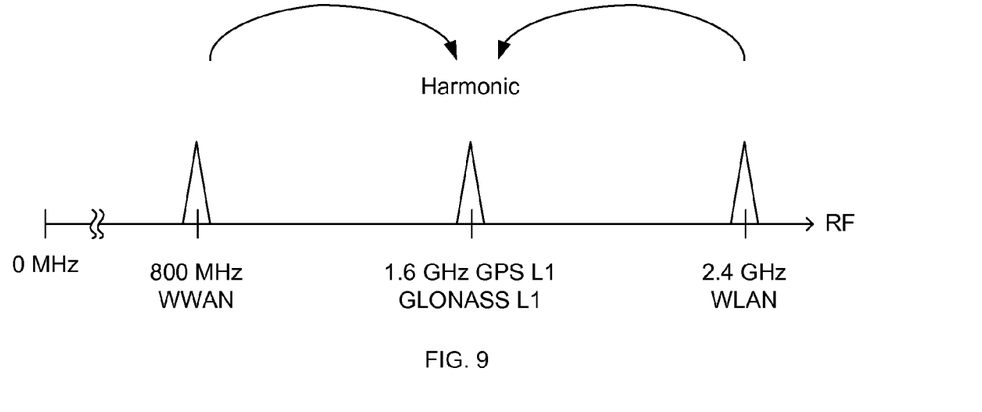
FIGS. 9-11 show how WWAN and WLAN signals interfere with GPS L1 signals.
Figure 10:
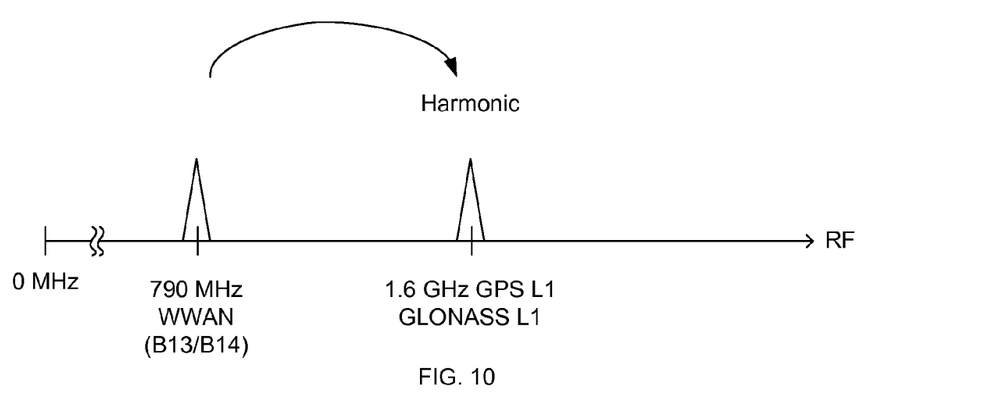
Figure 11:
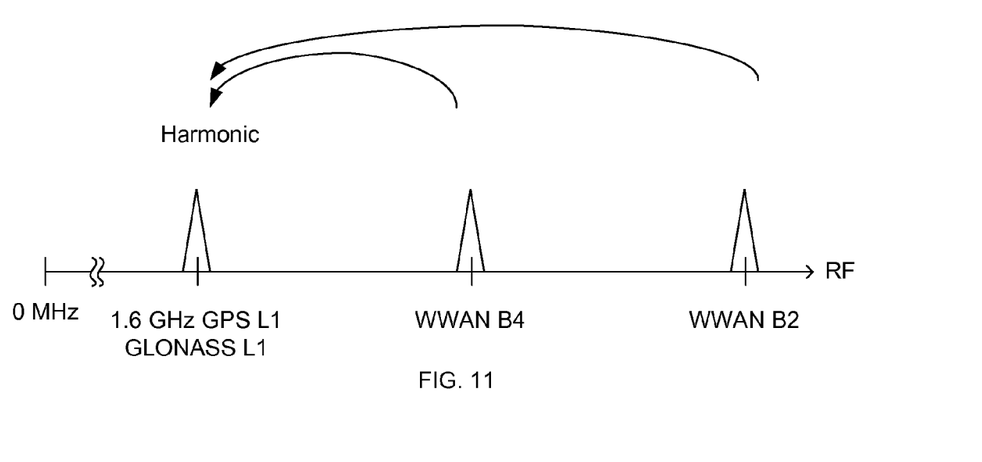

FIGS. 9-11 show how WWAN and WLAN signals interfere with GPS L1 signals. In FIG. 9, transmitters in the mobile device 400 transmit both an 800 MHz WWAN signal and a 2.4 GHz WLAN signal. The 800 MHz WWAN signal and the 2.4 GHz WLAN signal have an inter-product harmonic that falls within the 1.6 GHz GPS L1 band or the GLONASS L1 band.

Therefore, a harmonic interferer interfering with the 1.6 GHz GPS L1 band or the GLONASS L1 band may be formed when the mobile device 400 transmits a WWAN signals and a WLAN signal simultaneously.

In FIG. 10, a higher order harmonic interferer is formed when a mobile device 400 transmits a WWAN signal. For example, when the mobile device 400 transmits approximately at 790 MHz (e.g., on the B13 or B14 WWAN bands), a harmonic interferer may be created at 1.6 GHz within the 1.6 GHz GPS L1 band or GLONASS L1 band.

In FIG. 11, two higher frequency signals mix to produce an interfering harmonic within the lower L1 band. For example, when the mobile device 400 transmits both a WWAN signal in band B4 and band B2, the transmissions may result in an inter-product interferer within the 1.6 GHz GPS L1 band or GLONASS L1 band.

Other single transmissions and combinations of transmissions of WLAN and/or WWAN signals may cause interference within a GNSS band (such as an L1, L2 or L5 band). Not only transmissions from a mobile device 400 may result in interfering harmonics, transmissions from very nearby WLAN, WWAN and other transmitters may cause similar interfering harmonic signals within a particular GNSS band.

Figure 12:
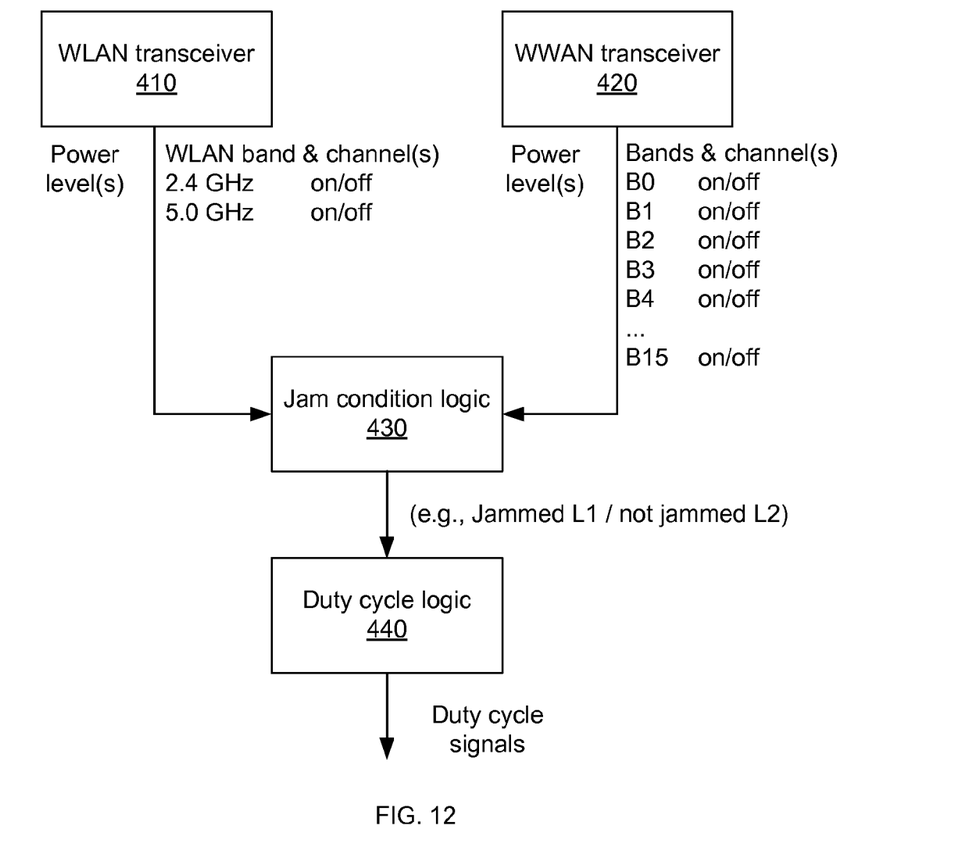

FIGS. 12-16 show various duty cycle signals and logic to create duty cycle signals for a shared L1/L2 hardware receiver chain 202, in accordance with some embodiments of the present invention. In FIG. 12, transmissions from a WLAN transceiver 410 and a WWAN transceiver 420 are monitored by jam condition logic 430 to determine whether an interfering harmonic falls within a GNSS band. Based on the jam condition logic 430, duty cycle logic 440 determines which band(s) to emphasize and which band(s) to deemphasize.

For example, the WLAN transceiver 410 informs the jam condition logic 430 which bands are currently or soon to be transmitting from the mobile device 400. The WLAN transceiver 410 may also inform the jam condition logic 430 which channels are currently used, thereby providing a more precise location of transmitted signals causing potential harmonic interference. The WLAN transceiver 410 may also inform the jam condition logic 430 of the power level currently used at the transmitter. Similarly, the WWAN transceiver 420 informs the jam condition logic 430 of the currently used band(s), channel(s) and transmit power level.

Based on the current conditions of the WLAN transceiver 410 and the WWAN transceiver 420, the jam condition logic 430 determines whether an interfering signal will appear within a particular GNSS band. For example, if the WWAN transceiver 420 is transmitting at maximum power at 800 MHz and the WLAN transceiver 410 is also transmitting at maximum power at 2.4 GHz (as in FIG. 9), the jam condition logic 430 may determine that an interfering harmonic appears within the GPS L1 band.

The duty cycle logic 440 generates duty cycle signals that are based on the expected interfering harmonic, which may be referred to as causing a jam condition. For example, when no jam condition is expected, half of the duty cycle may be devoted to receiving the L1 band and the other half of the duty cycle may be devoted to receiving the L2 band signal. When a jam condition is expected on a particular jammed band, that particular jammed band may be avoided. That is, no time to a small fraction of the time may be devoted to receiving signals on the particular jammed band, while a majority to all of the duty cycle may be devoted to receiving signals on a second non-jammed band.

Note the jam condition logic 430 and the duty cycle logic 440 are separated for simplicity but may be integrated into a single logic unit that accepts conditions from transceivers within the mobile device 400 and directly generates duty cycle signals.

In the following examples, the duty cycle logic 440 generates a first duty cycle signal and a second duty cycle signal to be applied to the shared L1/L2 hardware receiver chain 202 as the L1/L2 control signal 204 from the controller 302. The L1/L2 control signal 204 may be two separate signals, or alternatively, a single signal operating with the L1 band when the duty cycle signal is, say, logic high, and with the L2 band when the duty cycle signal is logic low.

Figure 13:
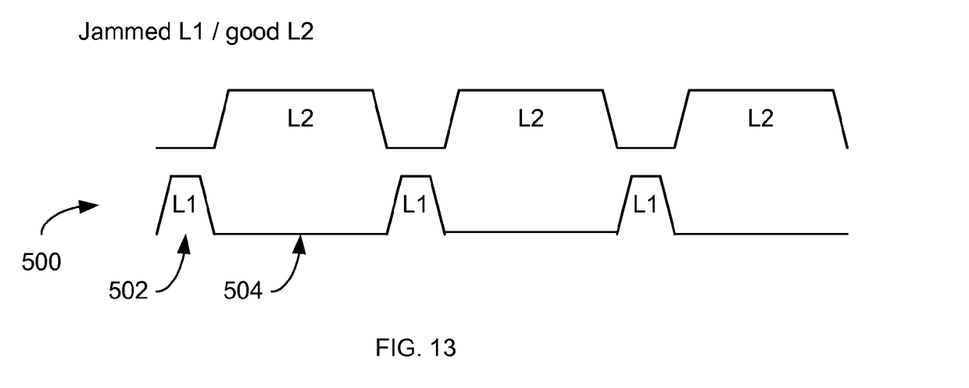
FIGS. 13-16 illustrate duty cycles of a receiver chain based on a quality of the L1 and L2 signals, in accordance with some embodiments of the present invention.

In FIG. 13, the L1 band is jammed and the L2 signal is available. A duty cycle signal 500 emphasis demodulating the L2 band signals over L1 band signals. At 502, the L1 band is periodically surveyed to determine if the quality of L1 band signals has improved enough to warrant more time of the duty cycle. At 504, a primary part of the duty cycle is spent receiving the good L2 band signals.

Figure 14:
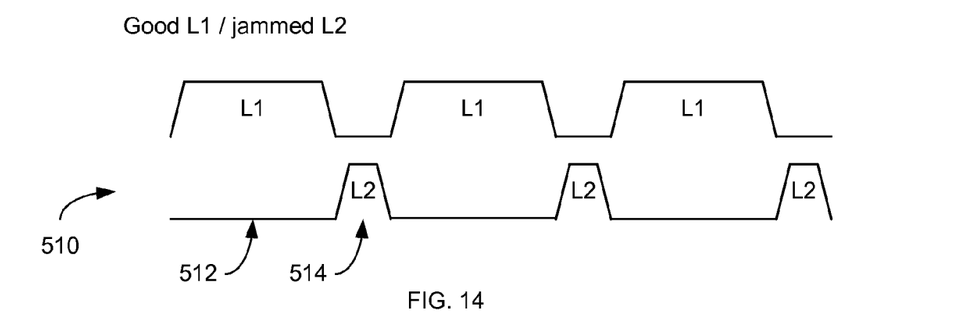

In FIG. 14, the L2 band is jammed and the L1 signal is available. A duty cycle signal 510 emphasis demodulating the L1 band signals over L2 band signals. At 512, the L2 band is periodically surveyed to determine if the quality of L2 band signals has improved enough to warrant more time of the duty cycle. At 514, a primary part of the duty cycle is spent receiving the good L1 band signals.

Figure 15:
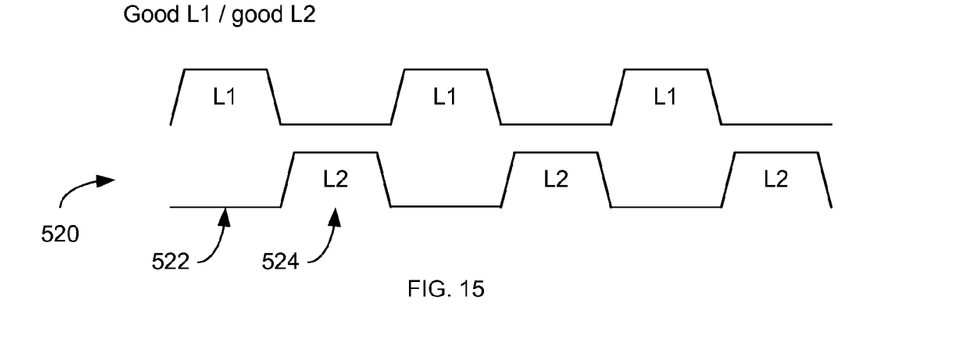

In FIG. 15, no jammed condition is determined. A duty cycle signal 520 is split between demodulating the L1 band signals and L2 band signals. At 522, for half of the duty cycle, the L1 band received. At 524, for the other half of the duty cycle, the L2 band received.

When considering only one signal, such as a strong L1 signals, power may be saved by enabling the L1 band during a small fraction of the duty cycle. For example, see U.S. Pat. No. 8,106,821 issued Jan. 31, 2012, and titled "Methods and apparatuses for use with mode-switchable navigation radio" to Farmer et al.

Figure 16:
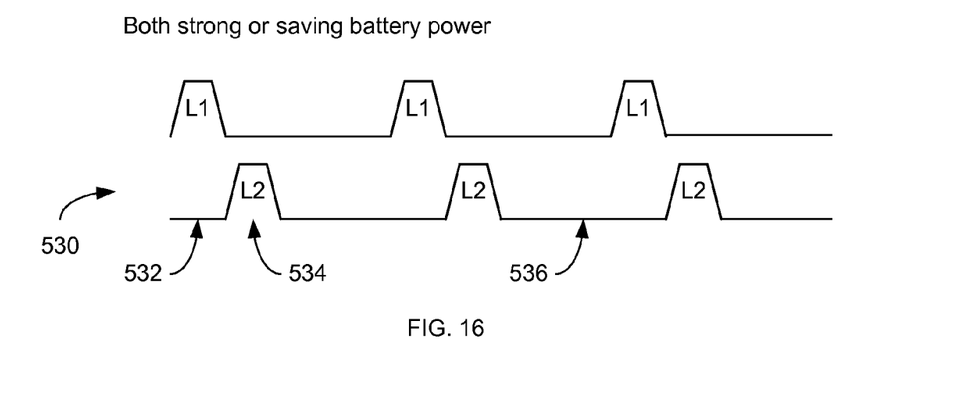

In FIG. 16, an example 530 is shown where the shared L1/L2 hardware receiver chain 202 is not operated during a down time of the duty cycle. For example, powering down may occur when the L1 and L2 signals are both strong and do not need a full half of the duty cycle. Alternatively, powering down may occur when battery saves is required. For example, this mode may be used when battery storage is less than a threshold level. If strong, positioning information from both bands may be determined in only a fraction of the duty cycle because the signals are strong. Power savings may be realized during the remainder of the duty cycle.

Alternately, the minimal duty cycle signal for the L1 band shown in FIGS. 13 and 16, and for the L2 band shown in FIGS. 14 and 16 may be reduced from a minimal survey time to a zero duty cycle, thereby leaving more of the duty cycle for the other band and/or more down time for battery savings.

Figure 17:
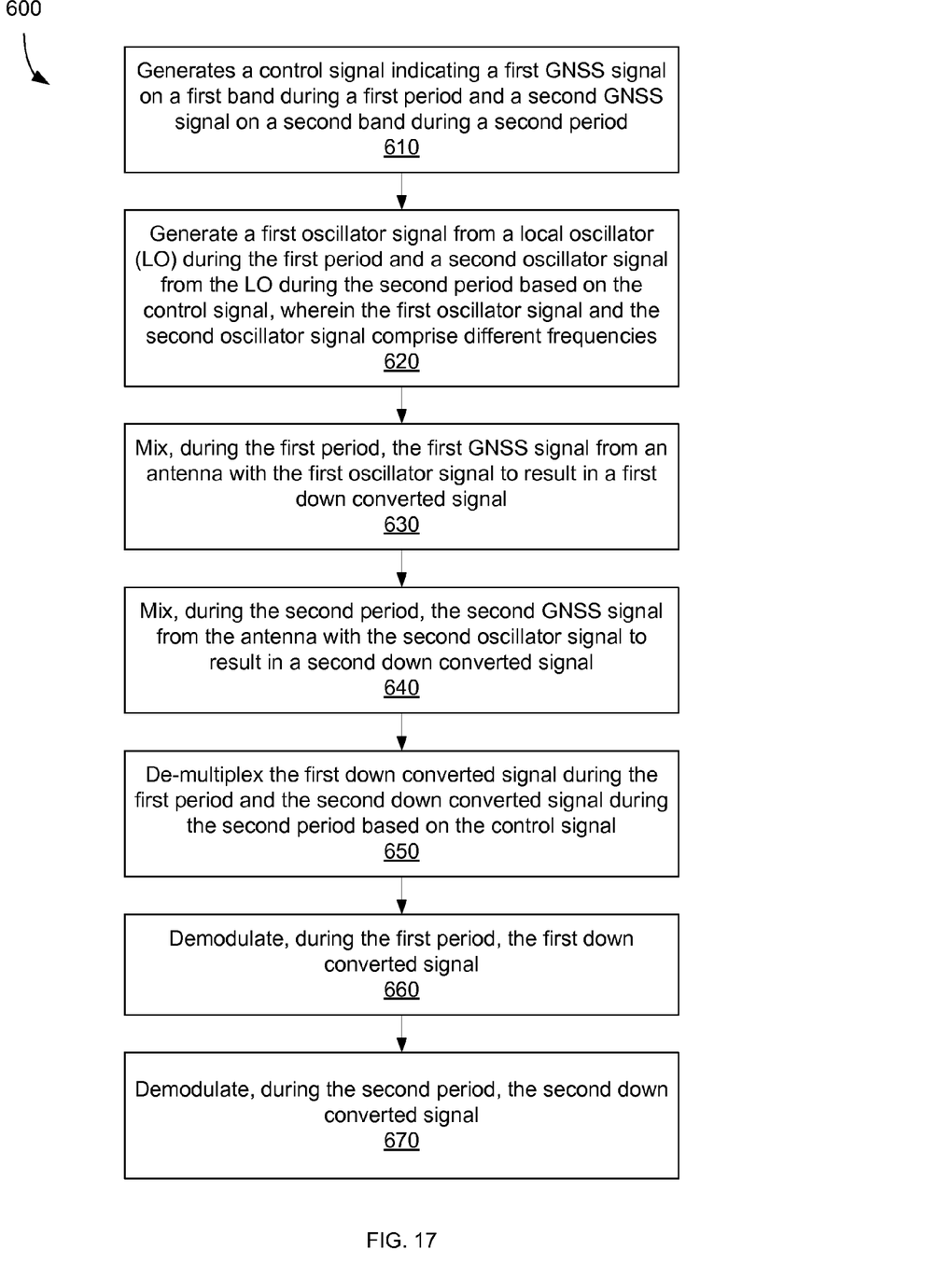
FIG. 17 shows a method in a mobile device to multiplex two GNSS signals on a single hardware receiver chain.

FIG. 17 shows a method 600 in a mobile device to multiplex two GNSS signals on a single hardware receiver chain. At 610, a processor 300 generates a control signal 204 that indicating either a first GNSS signal is to be on a first band during a first period or a second GNSS signal is to be on a second band during a second period. Similarly, the control signal 204 may indicate that no GNSS signal is to be one the receiver chain 202 and thus the chain goes idle.

At 620, a local oscillator (LO) generates a first oscillator signal during the first period and a second oscillator signal from the LO during the second period based on the control signal. The LO may be a phase-locked loop (PLL 230) generating the two oscillator signals. The first oscillator signal and the second oscillator signal comprise different frequencies.

At 630, a mixer 220 mixes, during the first period, the first GNSS signal from an antenna with the first oscillator signal to result in a first down converted signal. At 640, the mixer 220 mixes, during the second period, the second GNSS signal from the antenna with the second oscillator signal to result in a second down converted signal. A low-noise amplifier (LNA 210) may be situated between the antenna and the mixer 220.

At 650, the processor 300 uses a de-multiplexer module 304 to de-multiplex the first down converted signal during the first period and the second down converted signal during the second period based on the control signal. An IF filter 240 and an analog-to-digital convert (ADC 250) may reside in series between the mixer 220 and the de-multiplexer module 304.

At 660, the processor 300 uses a demodulator module 306 to demodulate, during the first period, the first down converted signal. At 670, the processor 300 uses the demodulator module 306 to demodulate, during the second period, the second down converted signal. The demodulator module 306 may alternate between the two signals by saving the previous settings and state variables.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device to multiplex two global navigation satellite system (GNSS) signals on a single hardware receiver chain, the method comprising:
    generating a control signal indicating a first GNSS signal on a first band during a first period and a second GNSS signal on a second band during a second period, wherein the first period and the second period of the control signal are periodic;
    generating a first oscillator signal from a local oscillator (LO) during the first period and a second oscillator signal from the LO during the second period based on the control signal;
    mixing, during the first period, the first GNSS signal from an antenna with the first oscillator signal to result in a first down converted signal;
    mixing, during the second period, the second GNSS signal from the antenna with the second oscillator signal to result in a second down converted signal;
    de-multiplexing the first down converted signal during the first period and the second down converted signal during the second period based on the control signal;
    demodulating, during the first period, the first down converted signal; and
    demodulating, during the second period, the second down converted signal;
    wherein the first oscillator signal and the second oscillator signal comprise different frequencies; and
    wherein the first period and the second period are durations based on at least one of a wireless local area network (WLAN) transmission from a WLAN transmitter, a wireless wide area network (WWAN) transmission from a WWAN transmitter or any combination thereof.

2. The method of claim 1, wherein the first band comprises an L1 band and the second band comprises an L2 band.

3. The method of claim 1, further comprising providing the control signal to a
low-noise amplifier (LNA) coupled between the antenna and a mixer.

4. The method of claim 1, wherein generating the first oscillator signal and the second oscillator signal comprises providing the control signal to a phase-locked loop (PLL) to produce the first oscillator signal and the second oscillator signal.

5. The method of claim 1, wherein the first GNSS signal and the second GNSS signal comprise a first GPS signal and a second GPS signal.

6. The method of claim 1, wherein the first down converted signal and the second down converted signal each comprise a common center frequency.

7. The method of claim 1, wherein the WWAN transmitter is within the mobile device.

8. The method of claim 1, wherein the WLAN transmitter is within the mobile device.

9. The method of claim 1, wherein the first period and the second period are durations based on a harmonic interference being within one of the first band and the second band.

10. The method of claim 1, wherein the first period and the second period are durations based on signal quality.

11. The method of claim 10, wherein the signal quality delineates jammed from non-jammed signals.

12. The method of claim 1, wherein the first period and the second period comprises less than a total duty cycle comprising the first period and the second period.

13. The method of claim 1, wherein the first period is greater than the second period.

14. A mobile device to multiplex two global navigation satellite system (GNSS) signals on a single hardware receiver chain, the mobile device comprising:
a controller configured to provide a control signal indicating a first GNSS signal on a first band during a first period and a second GNSS signal on a second band during a second period, wherein the first period and the second period of the control signal are periodic;
a local oscillator (LO) coupled to the controller, and configured to receive the control signal and to provide a first oscillator signal during the first period and a second oscillator signal during the second period, wherein the first oscillator signal and the second oscillator signal comprise different frequencies;
a mixer with inputs coupled to the LO and to an antenna, the mixer configured to generate a first down converted signal during the first period and generate a second down converted signal during the second period; and
a de-multiplexer coupled to the mixer and configured to separate the first down converted signal during the first period from the second down converted signal during the second period based on the control signal; and
a demodulator coupled to the de-multiplexer and configured to demodulate the first down converted signal during the first period and demodulate the second down converted signal during the second period
wherein the first oscillator signal and the second oscillator signal comprise different frequencies; and
wherein the first period and the second period are durations based on at least one of a wireless local area network (WLAN) transmission from a WLAN transmitter, a wireless wide area network (WWAN) transmission from a WWAN transmitter or any combination thereof.

15. The mobile device of claim 14, further comprising a filter with an input coupled to the mixer and an output to provide an analog filtered signal.

16. The mobile device of claim 14, wherein the mixer comprises a phase-locked loop (PLL) controlled by the control signal.

17. The mobile device of claim 14, wherein the first band comprising an L1 band, and wherein the second band comprising an L2 band.

18. The mobile device of claim 14, wherein the first GNSS signal and the second GNSS signal comprise a first GPS signal and a second GPS signal.

19. The mobile device of claim 14, wherein the first down converted signal and the second down converted signal each comprise a common center frequency.

20. The mobile device of claim 14, wherein the first period and the second period are durations based on signal quality.

21. A mobile device to multiplex two global navigation satellite system (GNSS) signals on a single hardware receiver chain, the mobile device comprising:
means for generating a control signal indicating a first GNSS signal on a first band during a first period and a second GNSS signal on a second band during a second period, wherein the first period and the second period of the control signal are periodic;
means for generating a first oscillator signal from a local oscillator (LO) during the first period and a second oscillator signal from the LO during the second period based on the control signal;
means for mixing, during the first period, the first GNSS signal from an antenna with the first oscillator signal to result in a first down converted signal;
means for mixing, during the second period, the second GNSS signal from the antenna with the second oscillator signal to result in a second down converted signal;
means for de-multiplexing the first down converted signal during the first period and the second down converted signal during the second period based on the control signal;
means for demodulating, during the first period, the first down converted signal; and
means for demodulating, during the second period, the second down converted signal;
wherein the first oscillator signal and the second oscillator signal comprise different frequencies; and
wherein the first period and the second period are durations based on at least one of a wireless local area network (WLAN) transmission from a WLAN transmitter, a wireless wide area network (WWAN) transmission from a WWAN transmitter or any combination thereof.

22. The mobile device of claim 21, wherein the first band comprises an L1 band and the second band comprises an L2 band.

23. The mobile device of claim 21, wherein the first down converted signal and the second down converted signal each comprise a common center frequency.

24. The mobile device of claim 21, wherein the first period and the second period are durations based on a harmonic interference being within one of the first band and the second band.

* * * * *